United States Patent
Voyer

(10) Patent No.: US 7,860,062 B2
(45) Date of Patent: Dec. 28, 2010

(54) METHOD AND DEVICE FOR DETERMINING A LIST OF AT LEAST ONE FIRST NODE OF A TELECOMMUNICATION NETWORK TO WHICH A MESSAGE HAS TO BE TRANSFERRED

(75) Inventor: Nicolas Voyer, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 925 days.

(21) Appl. No.: 11/735,572

(22) Filed: Apr. 16, 2007

(65) Prior Publication Data

US 2007/0242622 A1    Oct. 18, 2007

(30) Foreign Application Priority Data

Apr. 18, 2006    (EP) .................................. 06290644

(51) Int. Cl.
*H04W 4/00* (2009.01)
(52) U.S. Cl. ....................... 370/331; 455/436
(58) Field of Classification Search ................. 455/436
See application file for complete search history.

(56) References Cited

U.S. PATENT DOCUMENTS 6,119,011 A * 9/2000 Borst et al. ............... 455/452.2
7,184,421 B1 * 2/2007 Liu et al. ..................... 370/338
7,409,215 B2 * 8/2008 Kurose et al. ............... 455/436

FOREIGN PATENT DOCUMENTS

EP          1 324 532 A2    7/2003
WO    WO 2004/040863 A1    5/2004

* cited by examiner

*Primary Examiner*—Charles N Appiah
*Assistant Examiner*—Stamford Hwang
(74) *Attorney, Agent, or Firm*—Oblon, Spivak, McClelland, Maier & Neustadt, L.L.P.

(57) ABSTRACT

The present invention concerns a method and device for determining a list of at least one first node of a telecommunication network to which, a message received by a second node of the telecommunication network from a third node of the telecommunication network, has to be transferred. It is obtained, for each node of a part of the nodes, a first list comprising information representative of at least one cell said node manages, it is obtained, for at least each node of said part of the nodes, a second list comprising information representative of the neighbor cells of the at least one cell said node manages and it is determined the list of at least one first node to which the message has to be transferred by checking if information comprised in the second list of the first nodes are comprised in the first and the second lists of the third node.

27 Claims, 6 Drawing Sheets

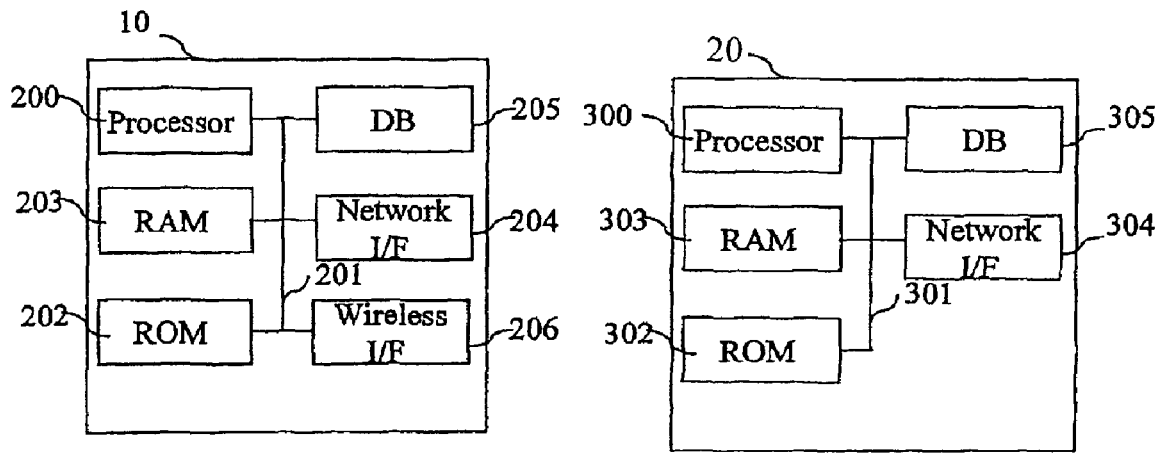
Fig. 2
Fig. 3
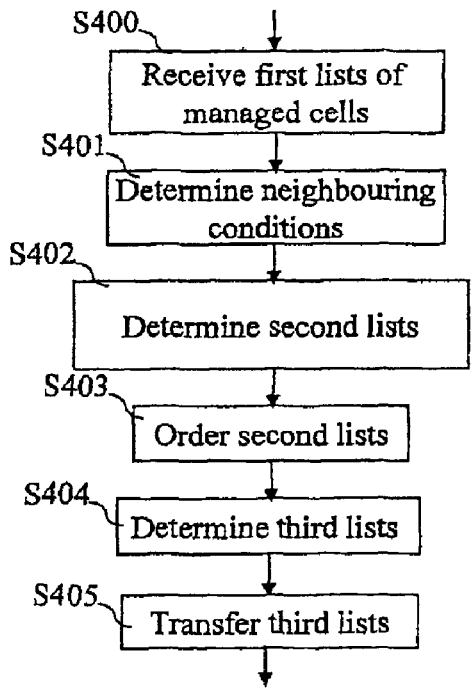
Fig. 4
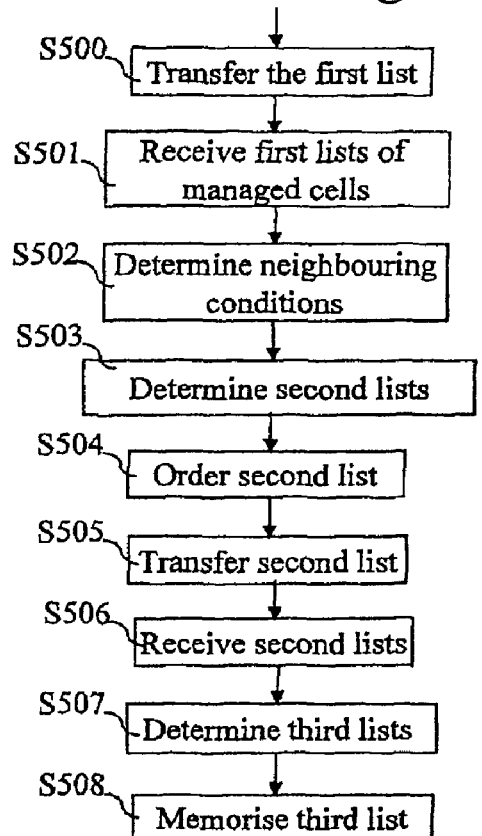
Fig. 5

METHOD AND DEVICE FOR DETERMINING A LIST OF AT LEAST ONE FIRST NODE OF A TELECOMMUNICATION NETWORK TO WHICH A MESSAGE HAS TO BE TRANSFERRED

BACKGROUND OF THE INVENTION

The present invention relates to a method and device for determining a list of at least one node of a telecommunication network to which, a message received by a another node of the telecommunication network has to be transferred.

The telecommunication network is a wired telecommunication network or a wireless cellular network.

A wireless cellular telecommunication network like a mobile telecommunication network, that provides telecommunication services to mobile terminals wandering inside of an area composed of multiple cells managed the nodes of the wireless telecommunication network, typically offers means to the mobile telecommunication operator to determine any time which node is serving the mobile terminal in order to enable a communication session establishment with the mobile terminal.

In order to enable the wireless operator to reach the mobile terminal, a centralizing equipment which commands the broadcast in each cell of the nodes of a location area of a paging request message in order to know, from the response of the mobile terminal to the paging message, which node is serving the mobile terminal. The command is classically a paging request message and is transferred by the centralizing device to each node of the location area. Such multiple transfers require large processing resources for the centralizing device.

In wireless cellular telecommunication network, it is also necessary to broadcast some messages to the mobile terminals, the message being a data packet containing part of a streaming video program that should be broadcast in each cell of the wireless cellular telecommunication network.

In wireless cellular telecommunication network, it is also necessary to broadcast some messages to the nodes of the telecommunication network, in order to inform them of a particular operation and maintenance event, or in order to request them some information like the status of communication established in the wireless cellular telecommunication network.

In wired telecommunication network, it is also necessary to broadcast some messages to the nodes of the telecommunication network in order to inform them of a particular event or in order to request them some information like the status of communication established in the wired telecommunication network.

In the wired telecommunication network, it is also important that the broadcasted messages are not received several times by the same node.

SUMMARY OF THE INVENTION

The aim of the invention is therefore to propose a method and a device which make it possible to reduce the number of received messages by the nodes.

To that end, the present invention concerns a method for determining a list of at least one first node of a telecommunication network to which, a message received by a second node of the telecommunication network from a third node of the telecommunication network, has to be transferred, characterised in that the method comprises the steps of:

obtaining for each node of a part of the nodes, a first list comprising information representative of at least one cell said node manages, obtaining, for at least each node of said part of the nodes, a second list comprising information representative of the neighbour cells of the at least one cell said node manages, determining the list of at least one first node to which the message has to be transferred by checking if information comprised in the second list of the first nodes are comprised in the first and the second lists of the third node.

The present invention concerns also a device for determining a list of at least one first node of a telecommunication network to which, a message received by a second node of the telecommunication network from a third node of the telecommunication network, has to be transferred, characterised in that the device comprises:

means for obtaining for each node of a part of the nodes, a first list comprising information representative of at least one cell said node manages, means for obtaining, for at least each node of said part of the nodes, a second list comprising information representative of the neighbour cells of the at least one cell said node manages, means for determining the list of at least one first node to which the message has to be transferred by checking if information comprised in the second list of the first nodes are comprised in the first and the second lists of the third node.

Thus, it is possible to avoid that the message is transferred more than one time to the first node. The second node will not transfer a message received from the third node to any first node which are neighbour of the third node.

According to a particular feature, the second lists are ordered according to a predetermined criterion and the list of at least one first node is obtained by determining if information comprised in the second list of the first node and comprised in the second list of the third node have, in the second list of the first node, an order upper than the order in the second list of the first node of information also comprised in the first list of the second node.

Thus, it is possible to avoid that the message is transferred more than one time to the first node. If the third node had transferred the message to multiple second nodes, only one of such second nodes transfers the message to the third node.

According to a mode of realisation of the present invention, the method is executed by the second node.

Thus, there is no need of having a centralizing device with important computational resources which executes the present invention.

According to a particular feature, the nodes of the part of the nodes are neighbour nodes of the second node.

Thus, the determination is simplified as it is reduced to a limited number of nodes.

According to a particular feature, the telecommunication network is a wireless cellular telecommunication network.

According to a particular feature, the neighbour nodes are determined by monitoring the number of cell reselections and/or handovers which have been executed by mobile terminals between the cells of the wireless cellular telecommunication network.

Thus, the neighbour nodes are determined using effective information. Cell reselections and handovers show that nodes are effectively neighbours.

According to a particular feature, the second lists are ordered according to the number of monitored cell reselections and/or handovers which have been executed by mobile terminals between the cells of the wireless cellular telecommunication network.

According to a particular feature, each neighbour node transfers its first and second lists to the second node and the second node transfers its first and second lists to the neighbour nodes.

Thus, the nodes are informed about the neighbouring conditions of other nodes and it is possible to avoid that the paging request message is transferred more than one time to the first node as far as the nodes are aware about neighbouring conditions of its neighbour nodes.

According to a particular feature, the second node determines plural lists of at least one first node to which the paging request message has to be sent according to the third node from which the second node receives the paging request message.

Thus, the determination of the list of at least one first node to which the paging request message has to be sent is made efficiently and avoids that the paging request message is transferred more than one time to the first node.

According to another mode of realisation of the present invention, the method is executed by a centralizing device of the wireless cellular telecommunication network.

Thus, there is no need to have nodes which have important computational resources which execute the present invention.

According to a particular feature, the centralizing device executes the method for each node.

Thus, there is no need to have nodes which have important computational resources which execute the present invention.

According to a particular feature, the centralizing device obtains from each node the first list and determines the second list of each node from the obtained first lists.

Thus, there is no need for the nodes to send the first and second lists to each neighbour nodes, resulting in less signalling among nodes.

According to a particular feature, the method comprises the step of determining the neighbouring conditions which exist between the nodes.

According to a particular feature, the neighbouring conditions are determined by monitoring the number of cell reselections and/or handovers which have been executed by mobile terminals between the cells of the wireless cellular telecommunication network.

Thus, the neighbour nodes are determined using effective information. Cell reselections and handovers show that nodes are neighbour.

According to a particular feature, the second lists are ordered according to the number of monitored cell reselections and/or handovers which have been executed by mobile terminals between the cells of the wireless cellular telecommunication network.

According to a particular feature, the determined lists of first nodes are transferred to the nodes.

According to still another aspect, the present invention concerns a use of a list of at least one first node to which a message has to be transferred in a telecommunication network by a second node of the telecommunication network, the message being received by the second node from a third node of the telecommunication network, characterised in that the second node:

determines which third node sent the message among plural third nodes of the telecommunication network, obtains the list of at least one first node which is associated to the determined third node, transfers the message to said at least one first node.

The present invention concerns also a device for transferring a message in a telecommunication network, to at least a first node of the telecommunication network by a second node of the telecommunication network, the message being received by the second node from a third node, characterised in that the device is included in the second node and comprises:

means for determining which third node sent the message among plural third nodes of the telecommunication network, means for obtaining the list of at least one first node which is associated to the determined third node, means for transferring the message to said at least one first node.

Since the features and advantages relating to the use of the list of at least one first node are the same as those set out above related to the methods and devices according to the invention, they will not be repeated here.

According to a particular feature, the telecommunication network is a wireless cellular telecommunication network, the message is a paging request message and the list of at least one first node is obtained by reading the list of at least one first node in the memory of the second node.

Thus, the second node obtains the list quickly and the transfer of the paging request message is done with few latency. Also, the list needs not be computed, saving the computation resource of the second node.

According to a particular feature, the at least one first node is a neighbour node of the second node.

According to a particular feature, the paging request message comprises a field comprising a value and if the value comprised in the field is equal to a predetermined value, the second node doesn't transfer the paging request message to said at least first node.

Thus, the propagation of paging request message among nodes can be stopped, and the transfer of paging request messages can be restricted to a limited number of nodes of the wireless cellular telecommunication network.

According to a particular feature, the paging request message comprises a field comprising a value and the second node decrements the value comprised in the field prior to transfer the paging request message to said at least one first node.

Thus, the transfer of paging request messages can be restricted to a limited number of nodes of the wireless cellular telecommunication network. The size of the area covered by the total number of nodes which relay the paging request message, can be adapted by setting the initial value of the initial third node.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

According to still another aspect, the present invention concerns a signal transferred in a telecommunication network comprising at least a first and a second nodes which manage cells of the telecommunication network, characterised in that the signal comprises a list of at least one first node to which a message has to be transferred by the second node when it receives the message from a third node or the signal comprises a list comprising information representative of the neighbour cells of at least one cell that the first node manages or the signal comprises a list comprising information representative of the neighbour cells of the at least one cell that the second node manages or the signal comprises a list comprising information representative of the neighbour cells of the at least one cell that the third node manages.

Since the features and advantages relating to the signal are the same as those set out above related to the methods and devices according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which:

FIG. 2 is a block diagram of a node according to the present invention;

FIG. 3 is a block diagram of a centralizing device according to the present invention;

FIG. 4 is an algorithm executed by the centralizing device according to a first mode of realisation of the present invention;

FIG. 5 is an algorithm executed by each node of the wireless cellular telecommunication network according to a second mode of realisation of the present invention;

FIGS. 8a to 8g represent the first lists of cells identifiers of the respective nodes $10_1$ to $10_7$;

FIGS. 9a to 9g represent the second lists of cells identifiers of the respective nodes $10_1$ to $10_7$;

FIGS. 10a to 10d represent the third lists of the node $10_2$;

DETAILED DESCRIPTION

Figure 1:
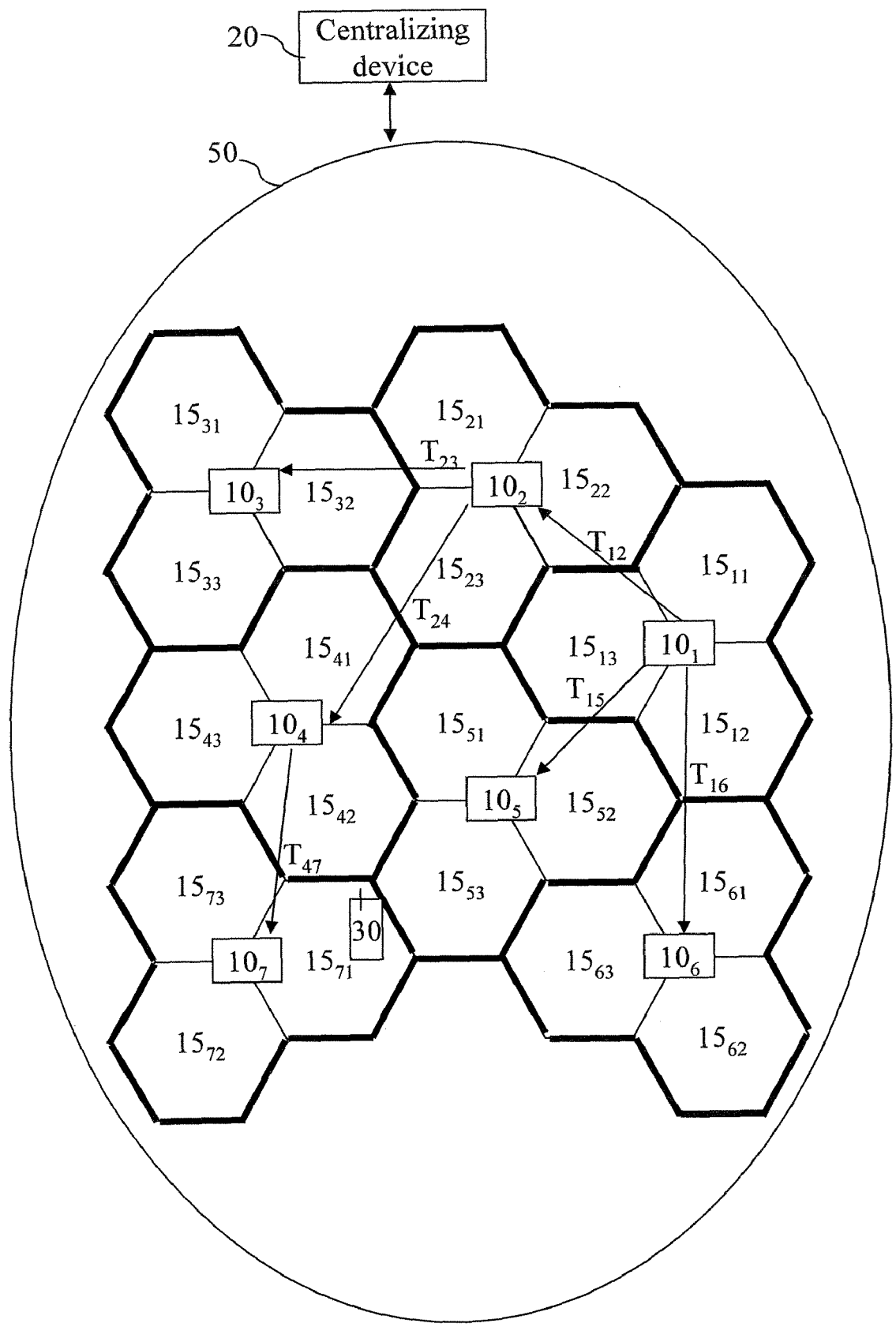
FIG. 1 is a diagram representing the architecture of a wireless cellular telecommunication network in which the present invention is implemented.

FIG. 1 is a diagram representing the architecture of a wireless cellular telecommunication network in which the present invention is implemented.

In the wireless cellular telecommunication network, a centralizing device 20 is connected to a plurality of nodes noted $10_1$ to $10_7$ through a telecommunication network 50.

In the FIG. 1, only one centralizing device 20 is shown, but we can understand that a more important number of centralizing devices 20 can be used in the present invention. The centralizing device 20 can be named also a mobility management entity.

The telecommunication network 50 is, as example and in a non limitative way, a dedicated wired network, a public network like a public switched network, an IP based network, a wireless network, an Asynchronous Transfer Mode network or a combination of above cited networks.

The telecommunication network 50 connects the nodes $10_1$ to $10_7$ together and enables the transfer of messages between the nodes 10 and/or between the nodes 10 and the centralizing device 20.

Each node 10 manages at least one cell 15. The node $10_1$ manages the cells $15_{11}$ to $15_{13}$, the node $10_2$ manages the cells $15_{21}$ to $15_{23}$, the node $10_3$ manages the cells $15_{31}$ to $15_{33}$, the node $10_4$ manages the cells $15_{41}$ to $15_{43}$, the node $10_5$ manages the cells $15_{51}$ to $15_{53}$, the node $10_6$ manages the cells $15_{61}$ to $15_{63}$ and the node $10_7$ manages the cells $15_{71}$ to $15_{73}$.

In the FIG. 1, only seven nodes 10 are shown, but we can understand that a more important number of nodes 10 can be used in the present invention. The nodes 10 can be named also a Enhanced Node B or base stations.

In the FIG. 1, each node 10 manages three cells 15, but we can understand that the number of managed cells 15 can be lower or higher and may vary between each node 10.

The present invention will be described here when the message transferred according to the present invention is a paging request message but we can understand that the present invention concerns also any other message which needs to be broadcasted in a wireless cellular telecommunication network.

When a remote telecommunication device, not shown in the FIG. 1, wants to establish a communication with a mobile terminal 30, the centralizing device 20 sends a paging request message to a node 10. That node, as example the node $10_1$, transfers it to other nodes 10 which manage at least a cell 15 which is neighbour of at least a cell $15_{11}$ to $15_{13}$ managed by the node $10_1$. Such other nodes 10 are the nodes $10_2$, $10_5$ and $10_6$. The transfer of paging request message is depicted by the arrows noted $T_{12}$, $T_{15}$ and $T_{16}$ in the FIG. 1. The other nodes $10_2$, $10_5$ and $10_6$ transfer or not the paging request message to third nodes 10 which are determined as it will be disclosed hereinafter. The node $10_2$ transfers the paging request message to the nodes $10_3$ and $10_4$ as it is represented by the arrows $T_{23}$ and $T_{24}$, the node $10_4$ transfers the paging request message to the node $10_7$ as it is represented by the arrow $T_{47}$.

Each time a node 10 receives a paging request message, it broadcasts in the at least one cell 15 it manages a paging indication message.

When a mobile terminal 30 detects a paging indication broadcasted in the cell 15 it has selected or where it is located, the mobile terminal 30 becomes aware that there is an incoming call from the wireless cellular telecommunication network. The mobile terminal 30 triggers the establishment of the communication.

In the FIG. 1, only one mobile terminal 30 is shown, but we can understand that a more important number of mobile terminals 30 exist in the present invention.

FIG. 2 is a block diagram of a node according to the present invention.

Figure 6:
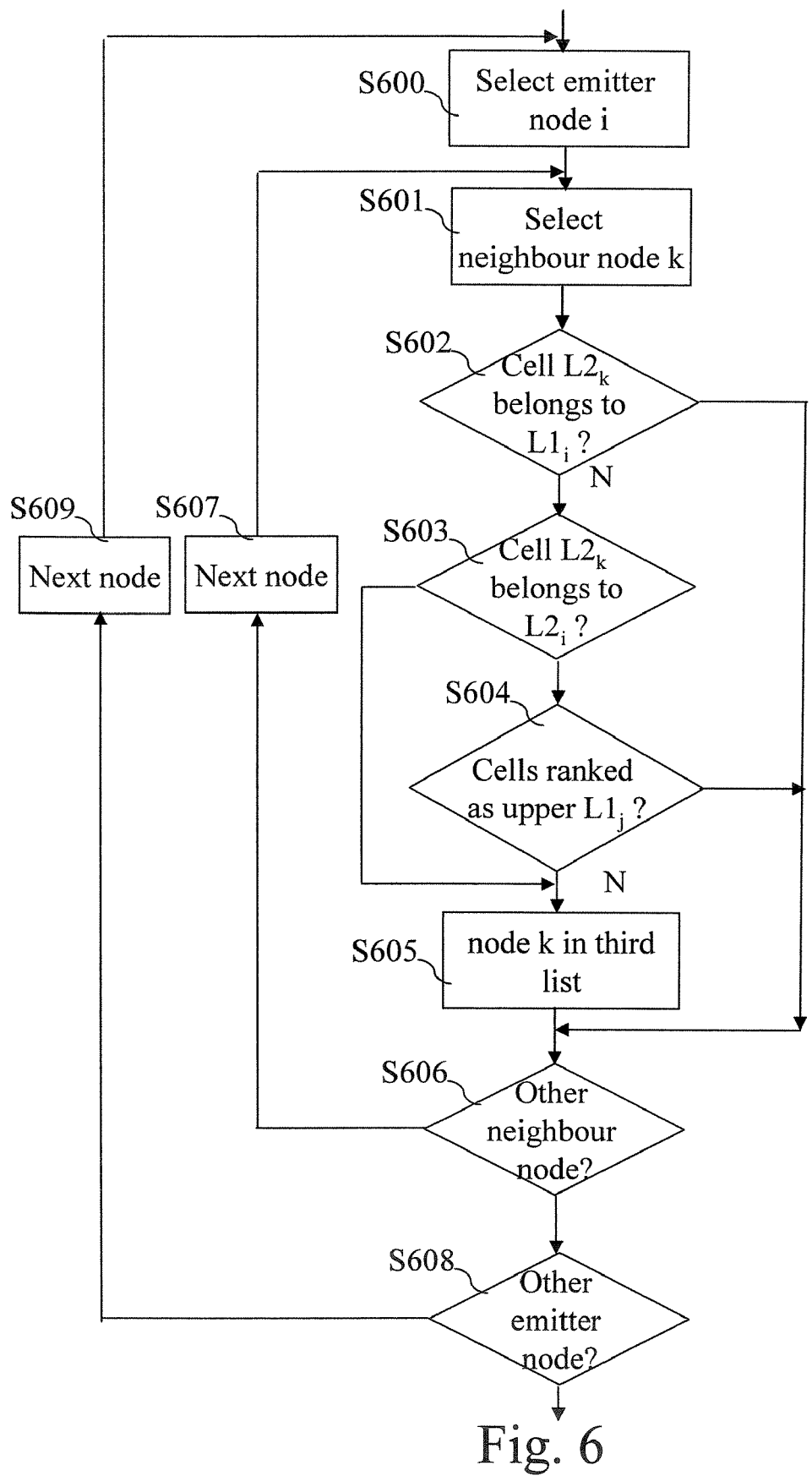
FIG. 6 is an algorithm for determining a list of nodes to which a paging request message has to be transferred according to the present invention.
Figure 7:
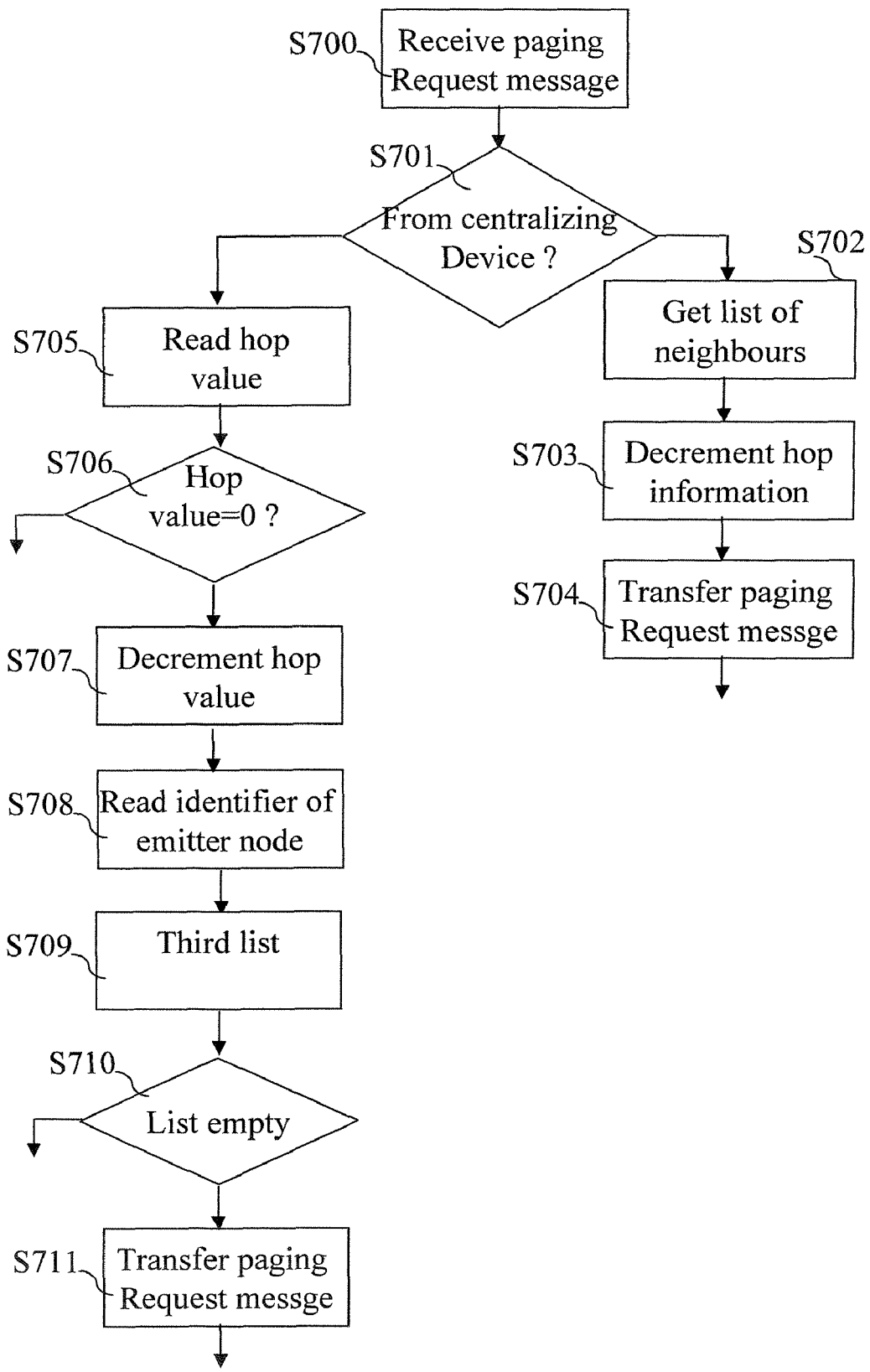
FIG. 7 is an algorithm executed by each node of the telecommunication network for transferring a message according to the present invention.

The node 10 has, for example, an architecture based on components connected together by a bus 201 and a processor 200 controlled by the programs as disclosed in the FIG. 7 and the FIGS. 5 and 6 according to the second mode of realisation of the invention.

The bus 201 links the processor 200 to a read only memory ROM 202, a random access memory RAM 203, a database 205, a network interface 204 and a wireless interface 206.

The memory 203 contains registers intended to receive variables, and the instructions of the programs related to the algorithms as disclosed in the FIG. 7 and the FIGS. 5 and 6 according to the second mode of realisation.

The processor 200 controls the operation of the network interface 204 and the wireless interface 206.

The read only memory 202 contains instructions of the programs related to the algorithms as disclosed in the FIG. 7 and the FIGS. 5 and 6 according to the second mode of realisation, which are transferred, when the node 10 is powered on to the random access memory 203.

The node 10 is connected to the telecommunication network 50 through the network interface 204. As example, the network interface 204 is a DSL (Digital Subscriber Line) modem, or an ISDN (Integrated Services Digital Network) interface, etc. The communications established or received by the mobile terminals 30 located in the cell 15 managed by the node 10 go through the network interface 204 and the wireless interface 206.

The node 10 comprises a database DB noted 205 which memorises the number of transitions between the cells 15 it manages and neighbouring cells 15. According to the second mode of realisation, the data base 205 memorises the first and second lists which are transferred by other nodes or by the centralizing device 20, and the third lists which are determined in algorithm disclosed at FIG. 6.

The wireless interface 206 enables the broadcast of paging indication messages and the establishment of communications between the mobile terminals 30 which are located in one of the cell 15 managed by the node 10 and other mobile terminals 30 or remote telecommunication devices not represented in FIG. 1.

FIG. 3 is a block diagram of a centralizing device according to the present invention.

The centralizing device 20 has, for example, an architecture based on components connected together by a bus 301 and a processor 300 controlled by the programs as disclosed in the FIG. 4 and the FIG. 6 according to the first mode of realisation of the present invention.

The bus 301 links the processor 300 to a read only memory ROM 302, a random access memory RAM 303 and a network interface 304.

The memory 303 contains registers intended to receive variables, and the instructions of the programs related to the algorithms as disclosed in the FIG. 4 and the FIG. 6 according to the first mode of realisation of the present invention.

The read only memory 302 contains instructions of the programs related to the algorithms as disclosed in the FIG. 4 and the FIG. 6 according to the first mode of realisation of the present invention, which are transferred, when the centralizing device 20 is powered on to the random access memory 303.

The network interface 304 is a DSL (Digital Subscriber Line) modem, or an ISDN (Integrated Services Digital Network) interface, etc. Through the network interface 304 and the telecommunication network 50, the processor 300 is able to transfer or receive messages to or from the nodes 10.

The database DB 305 memorises the number of transitions between the cells 15 of the wireless cellular network, the first lists of managed cells received in the algorithm disclosed in FIG. 4, and the seconds lists determined according to the algorithm disclosed in FIG. 4.

FIG. 4 is an algorithm executed by the centralizing device according to a first mode of realisation of the present invention.

The present algorithm will be described here when the message transferred according to the present invention is a paging request message but we can understand that the present invention concerns also any other message which needs to be broadcasted in a telecommunication network.

At step S400, the processor 300 of the centralizing device 20 receives from each node $10_1$ to $10_7$ of the wireless cellular telecommunication network a first list of at least one cell identifier of the at least one cell 15 the nodes $10_1$ to $10_7$ respectively manage.

The first lists of at least one cell identifier are disclosed in the FIGS. 8a to 8g.

Figures 8A, 8B, 8C, 8D, 8E, 8F, 8G, 9A, 9B, 9C, 9D, 9E, 9F, 9G, 10A, 10B, 10C, 10D:
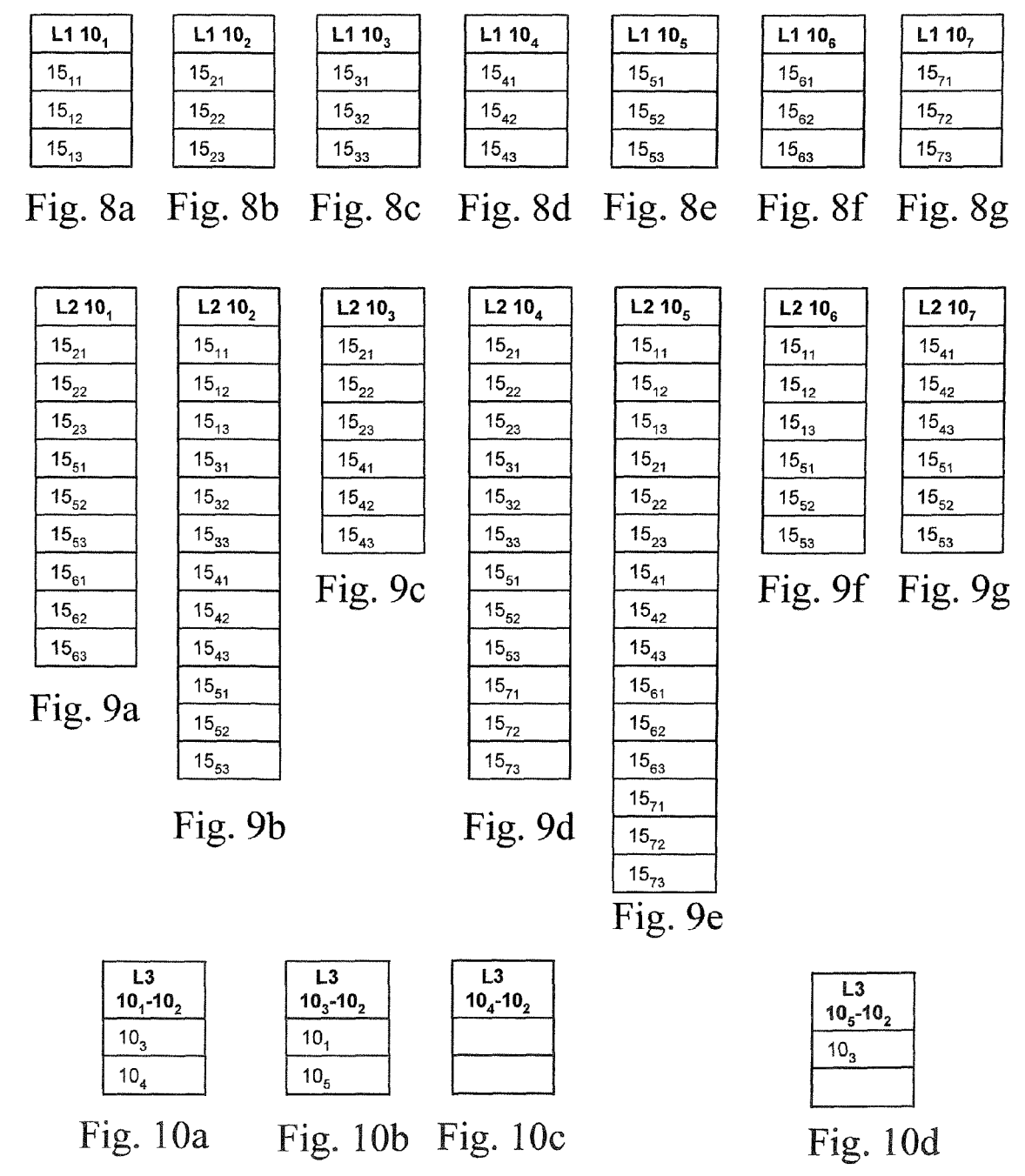

The FIG. 8a shows the first list of the node $10_1$ and comprises the identifier of the node $10_1$ and the identifiers of the cells $15_{11}$, $15_{12}$ and $15_{13}$ managed by the node $10_1$.

The FIG. 8b shows the first list of the node $10_2$ and comprises the identifier of the node $10_2$ and the identifiers of the cells $15_{21}$, $15_{22}$ and $15_{23}$ managed by the node $10_2$.

The FIG. 8c shows the first list of the node $10_3$ and comprises the identifier of the node $10_3$ and the identifiers of the cells $15_{31}$, $15_{32}$ and $15_{33}$ managed by the node $10_3$.

The FIG. 8d shows the first list of the node $10_4$ and comprises the identifier of the node $10_4$ and the identifiers of the cells $15_{41}$, $15_{42}$ and $15_{43}$ managed by the node $10_4$.

The FIG. 8e shows the first list of the node $10_5$ and comprises the identifier of the node $10_5$ and the identifiers of the cells $15_{51}$, $15_{52}$ and $15_{53}$ managed by the node $10_5$.

The FIG. 8f shows the first list of the node $10_6$ and comprises the identifier of the node $10_6$ and the identifiers of the cells $15_{61}$, $15_{62}$ and $15_{63}$ managed by the node $10_6$.

The FIG. 8g shows the first list of the node $10_7$ and comprises the identifier of the node $10_7$ and the identifiers of the cells $15_{71}$, $15_{12}$ and $15_{73}$ managed by the node $10_7$.

At next step S401, the processor 300 determines the neighbouring conditions which exist between the nodes 10. In a variant, the processor 300 determines the neighbouring conditions which exist between each cell 15 of which the identifier is comprised in a first list.

The neighbouring conditions are determined, as example and in a non limitative way, from radio planning techniques or by monitoring the number of cell reselections and/or handovers which have been executed by other mobile terminals between the cells 15 of the wireless cellular telecommunication network or by monitoring the quantity of data transferred in each link which interconnect the nodes. When a cell 15 managed by a node 10 is neighbour of a cell 15 managed by another node 10, the nodes 10 are neighbour.

Each time a mobile terminal 30, which is in idle mode, moves from one cell 15 to another cell 15, the mobile terminal 30 sends a cell reselection message to the node 10 which manages the newly selected cell 15. The mobile terminal 30 is in an idle mode when it is not in communication with another telecommunication device. When a mobile terminal 30 is in the idle mode, it has to continuously reselect the best cell 15 in case a communication has to be established.

Each time a mobile terminal 30 which is in communication with a remote telecommunication device selects another cell 15, the mobile terminal 30 sends a message representative of the handover to the node 10 which manages the newly selected cell 15.

According to the example of the FIG. 1, the node $10_1$ is neighbour of the nodes $10_2$, $10_5$ and $10_6$, the node $10_2$ is neighbour of the nodes $10_1$, $10_3$, $10_4$ and $10_5$, the node $10_3$ is neighbour of the nodes $10_2$ and $10_4$, the node $10_4$ is neighbour of the nodes $10_3$, $10_2$, $10_5$ and $10_7$, the node $10_5$ is neighbour of the nodes $10_1$, $10_2$, $10_4$, $10_6$ and $10_7$, the node $10_6$ is neighbour of the nodes $10_1$ and $10_5$, the node $10_7$ is neighbour of the nodes $10_4$ and $10_5$.

According to the example of the FIG. 1, the cells $15_{22}$, $15_{23}$, $15_{51}$, $15_{52}$ and $15_{61}$ are neighbour of the cells $15_{11}$ to $15_{13}$ At next step S402, the processor 300 determines, for each node 10 a second list.

The second lists are disclosed in the FIGS. 9a to 9g.

The FIG. 9a shows the second list of the node $10_1$ and comprises the identifier of the node $10_1$, the identifiers of the cells $15_{21}$ to $15_{23}$, $15_{51}$ to $15_{53}$ and $15_{61}$ to $15_{63}$, which are respectively managed by the nodes $10_2$, $10_5$ and $10_6$.

The FIG. 9b shows the second list of the node $10_2$ and comprises the identifier of the node $10_2$, the identifiers of the cells $15_1$, to $15_{13}$, $15_{31}$ to $15_{33}$, $15_{41}$ to $15_{43}$ and $15_{51}$ to $15_{53}$, which are respectively managed by the nodes $10_1$, $10_3$, $10_4$ and $10_5$.

The FIG. 9c shows the second list of the node $10_3$ and comprises the identifier of the node $10_3$, the identifiers of the cells $15_{21}$ to $15_{23}$, and $15_{41}$ to $15_{43}$, which are respectively managed by the nodes $10_2$ and $10_4$.

The FIG. 9d shows the second list of the node $10_4$ and comprises the identifier of the node $10_4$, the identifiers of the cells $15_{21}$ to $15_{23}$, $15_{31}$ to $15_{33}$, $15_{51}$ to $15_{53}$ and $15_{71}$ to $15_{73}$, which are respectively managed by the nodes $10_2$, $10_3$, $10_5$ and $10_7$.

The FIG. 9e shows the second list of the node $10_5$ and comprises the identifier of the node $10_5$, the identifiers of the cells $15_1$ to $15_{13}$, $15_{21}$ to $15_{23}$, $15_{41}$ to $15_{43}$, $15_{61}$ to $15_{63}$ and $15_{71}$ to $15_{73}$, which are respectively managed by the nodes $10_1$, $10_2$, $10_4$, $10_6$ and $10_7$.

The FIG. 9f shows the second list of the node $10_6$ and comprises the identifier of the node $10_6$, the identifiers of the cells $15_{11}$ to $15_{13}$ and $15_5$, to $15_{53}$, which are respectively managed by the nodes $10_2$ and $10_5$.

The FIG. 9g shows the second list of the node $10_7$ and comprises the identifier of the node $10_7$, the identifiers of the cells $15_{41}$ to $15_{43}$ and $15_{51}$ to $15_{53}$, which are respectively managed by the nodes $10_4$ and $10_5$.

In a variant, each second list of a node 10 comprises the identifier of the node 10 and only the identifiers of the cells 15 which are neighbour of the cells 15 managed by the node 10. As example, the identifiers of the cells $15_{21}$, $15_{53}$ and $15_{62}$, are not included in the second list as they are not neighbour of the cells 15 managed by the node $10_1$.

In another variant, the second list comprises the identifier of the node 10 and the identifiers of the nodes 10 which manage cells 15 which are neighbour of the cell or cells 15 managed by the node 10. Such nodes 10 are neighbour nodes. As example, the second list of the node $10_1$ comprises the identifier of the node $10_1$ and the identifiers of the nodes $10_2$, $10_5$ and $10_6$.

At next step S403, the processor 300 puts the identifiers comprised in each determined second list in an order according to a predetermined criterion. That criterion is, as example and in non limitative way, the number of monitored cell reselections and/or handovers monitored between the cells 15 it manages and each cell 15 the identifier of which is comprised in the second list. Any other criterion can be used in the present invention like an alphanumerical criterion. A yet another criterion is the quantity of data transferred in each link which interconnect the nodes.

At next step S404, the processor 300 determines at least one third list for each node 10.

For each node 10, the processor 300 determines as many third lists as the node 10 has neighbour nodes 10.

The third list comprises the identifiers of the nodes 10 to which the paging request message has to be transferred if the node 10 receives a paging request message from another node 10.

The determination of the third lists will be disclosed in more detail in reference to the FIG. 6.

At next step S405, the processor 300 transfers the determined third lists to the nodes 10 through the telecommunication network 50.

It has to be noted here that, in a variant of realisation the processor 300, instead of executing the steps S404 and S405, transfers the ordered second lists to each node 10.

FIG. 5 is an algorithm executed by each node of the wireless cellular telecommunication network according to a second mode of realisation of the present invention.

The present algorithm will be described here when the message transferred according to the present invention is a paging request message but we can understand that the present invention concerns also any other message which needs to be broadcasted in a telecommunication network.

At step S500, the processor 200 of, as example, the node $10_1$ transfers the first list of at least one cell identifier of the at least one cell 15 the node $10_1$ manages to the centralizing device 20 or to the other nodes $10_2$ to $10_7$ of the wireless cellular telecommunication network.

At step S501, the processor 200 receives from each node $10_2$ to $10_7$ the first list of at least one cell identifier of the at least one cell 15 the node 10 manages, or receives from the centralizing device 20, the first lists of at least one cell identifier of the at least one cell 15 the node $10_2$ to $10_7$ respectively manage.

The first lists of cells identifiers are disclosed in the FIGS. 8b to 8g.

At next step S502, the processor 200 determines the neighbouring conditions which exist between the nodes 10. In a variant, the processor 200 determines the neighbouring conditions which exist between each cell 15 of which the identifier is comprised in a first list.

The determination of neighbouring conditions is similar as the one disclosed in reference to the step S401 of the FIG. 4, it will not be repeated.

At next step S503, the processor 200 determines, a second list of the node $10_1$. The second list is as the one disclosed in the FIG. 9a.

In a variant, the second list of a node $10_1$ comprises the identifier of the node $10_1$ and only the identifiers of the cells 15 which are neighbour of the cell or cells 15 managed by the node $10_1$. As example, the identifiers of the cells $15_{21}$, $15_{53}$ and $15_{62}$, are not included in the second list as they are not neighbour of the cells 15 managed by the node $10_1$.

In another variant the second list comprises the identifier of the node 10, and the identifiers of the nodes 10 which manage the cells 15 which are neighbour of the cell or cells 15 managed by the node 10. The second list of the node $10_1$ comprises the identifiers of the nodes $10_2$, $10_5$ and $10_6$.

At next step S504, the processor 200 puts the identifiers comprised in the determined second list in an order according to a predetermined criterion as disclosed in the step S403 of the FIG. 4. At that step, the processor 200 memorises the ordered second list.

At next step S505, the processor 200 transfers the ordered second list to at least its neighbour nodes 10 through the telecommunication network 50.

At next step S506, the processor 200 receives ordered second lists from its neighbouring nodes 10 through the telecommunication network 50 and memorises the received ordered second lists.

It has to be noted here that, in a variant of realisation the processor 200, instead of executing the steps S501 and S506, receives ordered second lists from the centralizing device 20 through the telecommunication network 50 and memorises the received ordered second lists.

At next step S507, the processor 200 determines at least one third list.

The processor 200 determines as many third lists as the node $10_1$ has neighbour nodes 10.

Each third list comprises the identifier of each node 10 to which the paging request message has to be transferred if the node receives a paging request message from another node 10.

The determination of the third lists will be disclosed in more detail in reference to the FIG. 6.

At next step S508, the processor 200 memorises the determined third lists.

FIG. 6 is an algorithm for determining a list of nodes to which a message has to be transferred according to the present invention.

The present algorithm will be described here when the message transferred according to the present invention is a paging request message but we can understand that the present invention concerns also any other message which needs to be broadcasted in a telecommunication network.

The present algorithm is executed by the centralizing device 20 according to the first mode of realisation of the present invention or by each node 10 of the wireless cellular telecommunication network according to the second mode of realisation of the present invention.

As example, the present algorithm will be disclosed when it is executed by the centralizing device 20. The present algorithm is executed for each node 10 of the wireless cellular telecommunication network.

At step S600, the processor 300 selects a first node 10 which is considered as the node 10 which has transferred a paging request message to the node 10 for which the present algorithm is executed.

As example, the node $10_1$ is considered as the node 10 which has transferred a paging request message to the node $10_2$ for which the present algorithm is executed.

At next step S601, the processor 300 selects a neighbour node 10 of the node $10_2$. The identifiers of the neighbour nodes 10 are comprised in the second list of the node $10_2$ or determined using the identifier or identifiers of the cell or cells 15 comprised in the second list of the FIG. 9b. As example, the processor 300 selects the neighbour node $10_3$.

It as to be noted here that, as the node $10_1$ is considered as the node 10 which has transferred a paging request message to the node $10_2$, the node $10_1$ doesn't need to be selected at step S601.

At next step S602, the processor 300 checks if the identifiers of the cells 15 comprised in the second list, shown in the FIG. 9c, of the node $10_3$ which has been selected at step S601 belong to the first list, shown in the FIG. 8a, of the node $10_1$ which has been selected at step S600.

If at least one identifier is comprised in the second list of the selected neighbour node $10_3$ and belongs to the first list of the node 10 which has been selected at step S600, the processor 300 moves to step S606.

If no identifier comprised in the second list of the selected neighbour node $10_3$ belongs to the first list of the node $10_1$ which has been selected at step S600, the processor 300 moves to step S603.

According to the present example, the processor 300 moves from step S602 to step S603.

At step S603, the processor 300 checks if the identifiers of the cells comprised in the second list of the selected neighbour node $10_3$ belong to the second list, shown in the FIG. 9a, of the node $10_1$ which has been selected at step S600.

If at least one identifier is comprised in the second list of the selected neighbour node $10_3$ belong to the second list of the node 10, which has been selected at step S600, the processor 300 moves to step S604.

If no identifier comprised in the second list of the selected neighbour node $10_3$ belongs to the first list of the node $10_1$, the processor 300 moves to step S605.

According to the present example, the cells identifiers $15_{21}$ to $15_{23}$ are comprised in both second lists, the processor 300 moves from step S603 to step S604.

At step S604, the processor 300 checks if at least one identifier of a cell 15 comprised in the second list of the selected neighbour node $10_3$ and belonging to the second list of the node $10_1$ has an upper rank in the second list of the selected neighbour node $10_3$ than each identifier of the cell 15 comprised in the first list, shown in FIG. 8b, of the node $10_2$.

If at least one identifier of a cell 15 comprised in the second list of the selected neighbour node $10_3$ and belonging to the second list of the node $10_1$ has an upper rank in the second list of the selected neighbour node $10_3$ than the identifiers of the cells 15 comprised in the first list, shown in FIG. 8b, of the node $10_2$, the processor 300 moves to step S606.

If no identifier of the cells 15 comprised in the second list of the selected neighbour node $10_3$ and belonging to the second list of the node 10, have an upper rank in the second list of the selected neighbour node $10_3$ than each identifier of the cell 15 comprised in the first list of the node $10_2$, the processor 300 moves to step S605.

According to the present example, the cells identifiers $15_{21}$ to $15_{23}$ have not an upper rank of the cells $15_{21}$ to $15_{23}$, the processor 300 moves from step S604 to step S605.

At step S605, the processor 300 inserts the identifier of the node $10_3$ in the third list of the node $10_2$ which is dedicated to the case where the node $10_1$ transferred a paging request message to the node $10_2$.

At next step S606, the processor 300 checks if they are other neighbour nodes 10 to consider using the second list of the node $10_2$.

If they are other neighbour nodes 10 to consider using the second list of the node $10_2$, the processor 300 moves to step S607.

If they are no other neighbour nodes 10 to consider using the second list of the node $10_2$, the processor 300 moves to step S608.

According to the example, the second list comprises identifiers of the cells 15 managed by nodes 10 which have not been considered, the processor 300 moves then to step S607.

At step S607, the processor 300 considers another node 10, as example the node $10_4$ which manages the cells $15_{41}$ to $15_{43}$.

The processor 300 returns then to step S601 where it selects the node $10_4$ considered at step S607.

The processor 300 moves then to step S602 already described.

According to the present example, as no identifier is comprised in the second list, shown in the FIG. 9d, of the selected neighbour node $10_4$ belongs to the first list of the node $10_1$ which has been selected at step S600, the processor 300 moves from step S602 to step S603 already described.

According to the present example, as the identifiers $15_{51}$ to $15_{53}$ are comprised in the second list of the selected neighbour node $10_4$ belong to the second list of the node $10_1$ which has been selected at step S600, the processor 300 moves to step S604 already described.

According to the present example, as the identifiers of the cells $15_{51}$ to $15_{53}$ comprised in the second list of the selected neighbour node $10_4$ and belonging to the second list of the node $10_1$ have a lower rank in the second list of the selected neighbour node $10_4$ than the identifiers of the cells $15_{21}$ to $15_{23}$ comprised in the first list of the node $10_2$, the processor 300 moves to step S605 already described.

At step S605, the processor 300 inserts the identifier of the node $10_4$ in the third list of the node $10_2$ which is dedicated to the case where the node $10_1$ transferred a paging request message to the node $10_2$ and moves to step S606 already described.

As they are other neighbour nodes 10 to consider using the second list of the node $10_2$, the processor 300 moves to step S607.

At step S607, the processor 300 considers another node 10, as example the node $10_5$ which manages the cells $15_{51}$ to $15_{53}$.

The processor 300 returns then to step S601 and selects the considered node at step S607.

The processor 300 moves then to step S602 already described.

According to the present example, the identifiers $15_{11}$ to $15_{15}$ comprised in the second list, shown in the FIG. 9e, of the selected neighbour node $10_5$ belong to the first list of the node $10_1$ which has been selected at step S600, the processor 300 moves to step S606 already described.

The FIG. 10a is the third list to be used by the node $10_2$ when it receives a paging request message from the node $10_1$. That third list comprises the identifiers of the neighbour nodes $10_3$ and $10_4$.

As they are no other neighbour nodes 10 to consider using the second list of the node $10_2$, the processor 300 moves to step S608. At step S608, the processor 300 checks if they are other emitter nodes to consider. Such emitter is a neighbour node 10. The processor 300 checks if they are other emitter nodes 10 to consider by verifying if all the nodes 10 which manage a cell 15 comprised in the second list of the node $10_2$ have not been considered as an emitter node 15.

If all the nodes 10 which manage a cell 15 comprised in the second list of the node $10_2$ have been considered as an emitter node 10, the processor 300 stops the current algorithm for the node 10 under process and considers, if needed, another node 10 in order to execute again the present algorithm.

If all the nodes 10 which manage a cell of which the identifier is comprised in the second list of the node $10_2$ have not been considered as an emitter node 10, the processor 300 moves to step S609.

According to the example, the second list comprises identifiers of cells 15 managed by nodes 10 which have not been considered, the processor 300 moves then to step S609.

At step S609, the processor 300 considers another node 10, as example the node $10_3$ which manages the cells $15_{31}$ to $15_{33}$.

The processor 300 returns then to step S600 and selects the considered node at step S609.

The processor moves then to step S601 already described.

At next step S601, the processor 300 selects a neighbour node 10 of the node $10_2$. The identifiers of the neighbour nodes 10 are comprised in the second list of the node $10_2$ or determined using the identifiers of the cells 15 comprised in the second list of the FIG. 9b. As example, the processor 300 selects the neighbour node $10_1$.

It as to be noted here that, as the node $10_3$ is considered as the node 10 which transferred a paging request message to the node $10_2$, the node $10_3$ is not selected at step S601.

According to the present example, no identifier comprised in the second list of the selected neighbour node $10_1$ belongs to the first list of the node $10_3$ which has been selected at step S600, the processor 300 moves to step S603.

At step S603, the processor 300 checks if the identifiers of the cells comprised in the second list of the selected neighbour node $10_3$ belong to the second list, shown in the FIG. 9a, of the node $10_1$ which has been selected at step S600.

According to the present example, as the identifiers $15_{21}$ to $15_{23}$ are comprised in the second list of the selected neighbour node $10_1$ and in the second list of the node $10_3$, the processor 300 moves to step S604.

According to the present example, as the cells identifiers $15_{21}$ to $15_{23}$ have not an upper rank of the cells $15_{21}$ to $15_{23}$, the processor 300 moves from step S605 to step S605.

At step S605, the processor 300 inserts the identifier of the node $10_1$ in the third list of the node $10_2$ which is dedicated to the case where the node $10_3$ transfers a paging request message to the node $10_2$.

At next step S606, the processor 300 checks if they are other neighbour nodes 10 to consider using the second list of the node $10_2$.

The processor 300 executes the loop constituted by the step S601 to S607 as far as the second list doesn't comprise any identifier of a cell 15 managed by nodes 10 which have not been considered.

Once each node 10 which manage a cell of which the identifier comprised in the second list have been considered, the processor 300 moves from step S606 to S608.

At step S608, the processor 300 checks if they are other emitter nodes 10 to consider. Such emitter node 10 is a neighbour node 10. The processor 300 checks if they are other emitter nodes 10 to consider by verifying if all the nodes 10 which manage a cell 15 of which the identifier is comprised in the second list of the node $10_2$ have not been considered as an emitter node 10.

The processor 300 executes the loop constituted by the step S600 to S609 as far as the second list doesn't comprise any identifier of a cell 15 managed by nodes 10 which have not been considered as an emitter node 10.

The present algorithm determines then plural third lists, one for each neighbour which may send a paging request message to the node $10_2$.

The FIG. 10b is the third list to be used by the node $10_2$ when it receives a paging request message from the node $10_3$. That third list comprises the identifiers of the neighbour nodes $10_1$ and $10_5$.

The FIG. 10c is the third list to be used by the node $10_2$ when it receives a paging request message from the node $10_4$. That third list is empty.

The FIG. 10d is the third list to be used by the node $10_2$ when it receives a paging request message from the node $10_5$. That third list comprises the identifier of the neighbour node $10_3$.

If all the nodes 10 which manage a cell 15 of which the identifier is comprised in the second list of the node $10_2$ have been considered, the processor 300 stops the current algorithm for the node $10_2$ under process and considers if there is another node 10 in order to execute again the present algorithm.

It has to be noted here that when the present algorithm is executed by each node 10, once all the nodes 10 which manage a cell 15 comprised in the second list of said node 10 have been considered, the processor 200 of said node 10 stops the present algorithm.

FIG. 7 is an algorithm executed by each node of the telecommunication network for transferring a message according to the present invention.

The present algorithm will be described here when the message transferred according to the present invention is a paging request message but we can understand that the present invention concerns also any other message which needs to be broadcasted in a telecommunication network.

At step S700, the processor 200 of a node 10 detects the reception of a paging request message through the telecommunication network 50 and the network interface 204. At that step, the processor 200 sends a paging notification message via the wireless interface on each cell controlled by the node 10.

At next step S701, the processor 200 checks if the paging request message has been transferred by the centralizing device 20 or by one neighbour node 10 using the identifier of the originating device which is comprised in the received message.

If the paging request message has been transferred by the centralizing device 20, the processor 200 moves to step S702.

If the paging request message has been transferred by the centralizing device 20, the processor 200 moves to step S705.

As example, the received message is transferred by the centralizing device 20 and received by the node $10_1$. The processor 200 of the node 10 moves then to step S702.

At step S702, the processor 200 of the node 10 consults its second list and determines its neighbour nodes 10 using the identifiers comprised in that list. The neighbour nodes are the nodes $10_2$, $10_5$ and $10_6$.

At next step S703, the processor 200 of the node $10_1$ decrements by one unit the value comprised in an information field of the paging request message, named hop field.

At next step S704, the processor 200 of the node 10, transfers through the network interface 204 and the telecommunication network 50 the paging request message with the modified value comprised in the information field of the paging request message to each of its neighbour nodes. In FIG. 1, the arrow noted $T_{12}$ depicts the transferred message to the node $10_2$, the arrow noted $T_{15}$ depicts the transferred message to the node $10_5$ and the arrow noted $T_{16}$ depicts the transferred message to the node $10_6$. After that, the processor 200 of the node $10_1$ returns to step S700 and waits for the reception of a new paging request message.

If the paging request message has been transferred by a node 10, the processor 200 moves from step S701 to step S705.

As example, the received message is transferred by the node $10_1$ and received by the node $10_2$. The processor 200 of the node $10_2$ moves then to step S705.

At next step S705, the processor 200 of the node $10_2$ reads the value comprised in the hop filed of the paging request message.

At next step S706, the processor 200 of the node $10_2$ checks if the read value is equal to a predetermined value, as example the null value.

If the read value is equal to the predetermined value, the processor 200 of the node $10_2$ stops the present algorithm and returns to step S700 and waits for the reception of a new paging request message.

If the read value is equal to the predetermined value, the processor 200 of the node $10_2$ moves to step S707 and decrements by one unit the value comprised in the hop field of the paging request message.

At next step S708, the processor 200 of the node $10_2$ reads the identifier of the node which transferred the paging request message. That identifier is the identifier of the node $10_1$.

At next step S709, the processor 200 of the node $10_2$ reads in the database DB 206 the identifiers of the nodes comprised in its third list which corresponds to the node $10_1$. These identifiers are the ones determined by the algorithm of the FIG. 6.

In a variant, if no third list corresponds to the node $10_1$ which sent the message, the processor 200 executes the algorithm of the FIG. 6 as it has been disclosed previously.

According to our example, the third list comprises the identifiers of the nodes $10_3$ and $10_4$.

At next step S710, the processor 200 of the node $10_2$ checks if the selected third list is empty or not.

If the selected third list is empty, the processor 200 of the node $10_2$ stops the present algorithm and returns to step S700 and waits for the reception of a new paging request message.

If the selected third list is not empty, the processor 200 of the node $10_2$ moves to step S711 and transfers, through the network interface 204 and the telecommunication network 50, the paging request message with the modified value comprised in the hop field of the paging request message to each node of which the identifier has been read at step S709. In FIG. 1, the arrow noted $T_{23}$ depicts the transferred message to the node $10_3$ and the arrow noted $T_{24}$ depicts the transferred message to the node $10_4$.

After that, the processor 200 of the node $10_1$ returns to step S700 and waits for the reception of a new paging request message.

It has to be noted here that, in a variant, instead of determining lists as it is disclosed in the present invention for each node, the lists are determined for each cell managed by each node 10.

Figure 11:
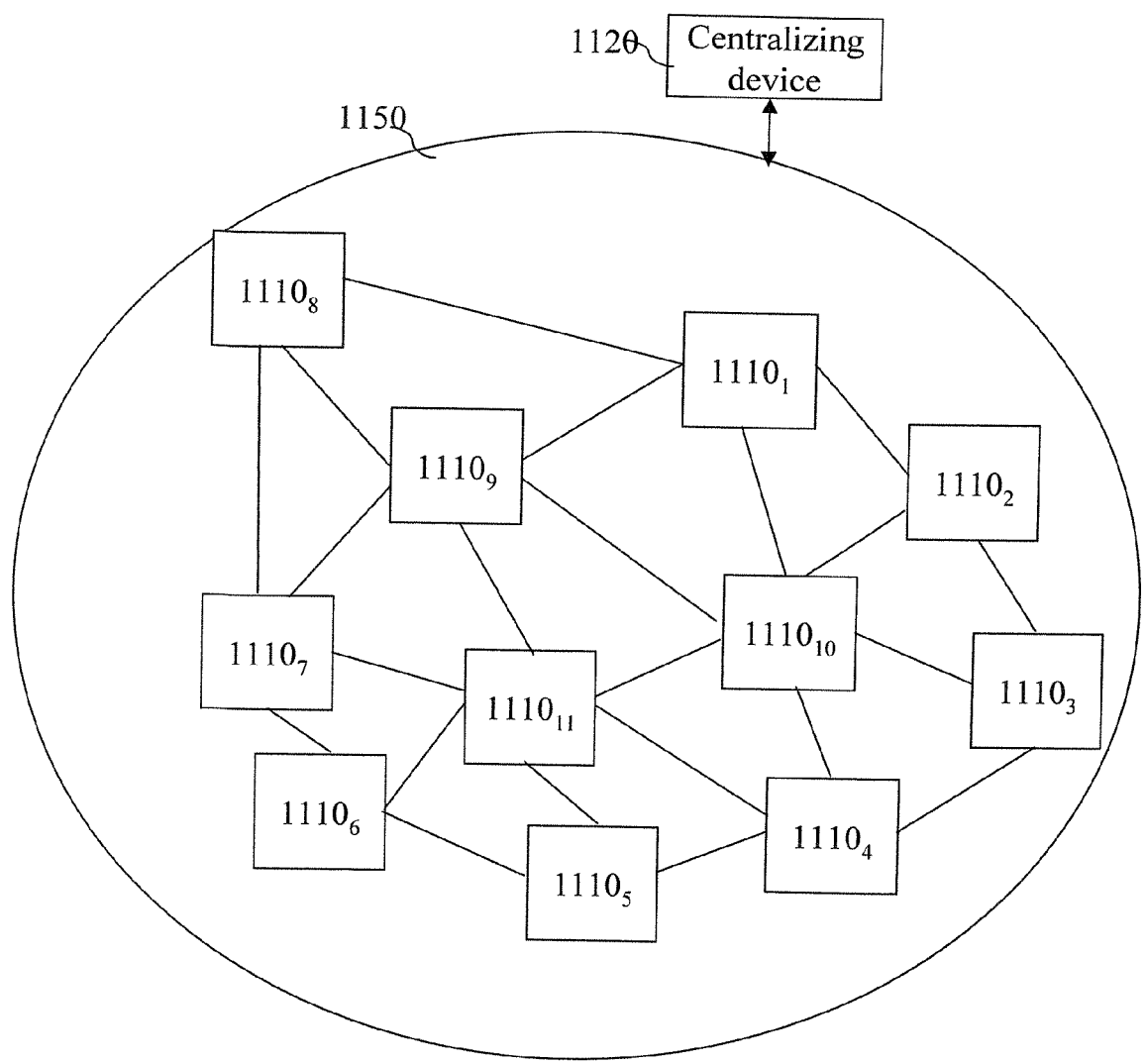
FIG. 11 is a diagram representing the architecture of a wired telecommunication network in which the present invention is implemented.

FIG. 11 is a diagram representing the architecture of a wired telecommunication network in which the present invention is implemented.

In the wireless cellular telecommunication network, a centralizing device 1120 is connected to a plurality of nodes noted $1110_1$ to $1110_1$, through a telecommunication network 1150.

In the FIG. 1b, only one centralizing device 1120 is shown, but we can understand that a more important number of centralizing devices 1120 can be used in the present invention. The centralizing device 1120 can be named also a network controller.

The telecommunication network 1150 comprises plural nodes 10 and is, as example and in a non limitative way, a dedicated wired network, a public network like a public switched network, an IP based network, a wireless network, an Asynchronous Transfer Mode network or a combination of above cited networks.

The telecommunication network 1150 connects the nodes $1110_1$ to $1110_{11}$ together and enables the transfer of messages between the nodes 1110 and/or between the nodes 1110 and the centralizing device 20.

Each node 1110 manages the transfer of data to or from the other nodes 1100 of the telecommunication network.

The node $1110_1$ is linked to the nodes $1110_2$, $1110_{10}$, $1110_9$ and $1110_8$. The node $1110_2$ is linked to the nodes $1110_{10}$ and $1110_3$. The node $1110_3$ is linked to the nodes $1110_2$, $1110_{10}$ and $1110_4$. The node $1110_4$ is linked to the nodes $1110_{10}$, $1110_3$, $1110_{11}$ and $1110_5$. The node $1110_5$ is linked to the nodes $1110_4$, $1110_1$, and $1110_6$. The node $1110_6$ is linked to the nodes $1110_5$, $1110_{11}$ and $1110_7$. The node $1110_7$ is linked to the nodes $1110_6$, $1110_8$, $1110_9$ and $1110_{11}$. The node $1110_8$ is linked to the nodes $1110_7$, $1110_9$ and $1110_1$. The node $1110_9$ is linked to the nodes $1110_8$, $1110_1$, $1110_{10}$, $1110_{11}$ and $1110_7$. The node $1110_{10}$ is linked to the nodes $1110_1$, $1110_2$, $1110_3$, $1110_4$, $1110_{11}$ and $1110_9$. The node $1110_{11}$ is linked to the nodes $1110_4$, $1110_5$, $1110_6$, $1110_7$, $1110_9$ and $1110_{10}$.

A node 1100 is neighbour of another node 1110 if it is linked to that node 1110.

The node 1110 have, except that they have no wireless interface, a similar architecture of the nodes 10, based on components connected together by a bus and a processor controlled by the programs as disclosed in the FIG. 7 and the FIGS. 5 and 6 according to the second mode of realisation of the invention.

The centralizing device 1120 has, the same architecture of the centralizing device 20, based on components connected together by a bus and a processor controlled by the programs as disclosed in the FIG. 4 and the FIG. 6 according to the first mode of realisation of the present invention.

As example, each node 1110 manages at least one cell, or one area, in which terminals not shown in the FIG. 11 are connected to the node 1110. The nodes are, as example and in a non limitative way, Digital Subscriber Line Access Multiplexers and the terminals are personal computers or set top boxes which are connected to the Digital Subscriber Line Access Multiplexer of the cell they belong to.

In another realisation mode of the invention, each node 1110 manages at least one cell, or communication port that identifies the link with another node 1110. The nodes 1110 are, as example and in a non limitative way, Internet Protocol router, Asynchronous Transfer Mode switch or Ethernet access point. According to FIG. 4 and FIG. 5, cells are neighbours if the communication ports identify the same link in the wired telecommunication network.

Naturally, many modifications can be made to the embodiments of the invention described above without departing from the scope of the present invention.

What is claimed is:

1. A method for transferring a message to a plurality of nodes of a telecommunication network the method comprising:
    obtaining, at each node of the plurality of nodes, a first list having information representative of at least one cell said respective node manages;
    obtaining, at each node of said plurality of nodes, a second list having information representative of neighboring cells of the at least one cell said respective node manages; and
    determining a third list including at least one first node of the plurality of nodes to which the message has yet to be transferred, the determining checking whether information included in the second list of the at least one first node is included in the first list of a third node of the plurality of nodes and, if not, whether the information is included in a second list of the third node, the message being received by a second node of the plurality of nodes from the third node.

2. The method according to claim 1, wherein
    the third list of at least one first node is obtained by determining when information included in both the second list of the first node and the second list of the third node has a lower rank in the second list of the first node than information included in the first list of the second node, and
    second lists of the plurality of nodes have information ordered according to a predetermind criterion.

3. The method according to claim 2, wherein the method is executed by the second node.

4. The method according to claim 3, wherein each node is a neighbor node of the second node.

5. The method according to claim 4, wherein the telecommunication network is a wireless cellular telecommunication network.

6. The method according to claim 5, wherein the neighbor nodes are determined by monitoring the number of cell reselections and/or handovers which have been executed by mobile terminals between cells of the wireless cellular telecommunication network.

7. The method according to claim 6, wherein the second lists are ordered according to a number of monitored cell reselections and/or handovers which have been executed by mobile terminals between the cells of the wireless cellular telecommunication network.

8. The method according to claim 4, wherein each neighbor node transfers the first and second list of the neighbor node to the second node and the second node transfers the first and second list of the second node to each neighbor node.

9. The method according to claim 8, wherein the second node receives the message from different third nodes and the second node determines a plurality of lists of at least one first node to which the message has to be sent according to the third node from which the second node receives the message.

10. The method according to claim 2, wherein the method is executed by a centralizing device of a wireless cellular telecommunication network.

11. The method according to claim 10, wherein the centralizing device executes the method for each node.

12. The method according to claim 11, wherein the centralizing device obtains the first list from each node and determines the second list of each node from the obtained first lists.

13. The method according to claim 12, wherein the method further comprises:
    determining neighboring conditions which exist between each node.

14. The method according to claim 13, wherein the neighboring conditions are determined by monitoring a number of cell reselections and/or handovers which have been executed by mobile terminals between cells of the wireless cellular telecommunication network.

15. The method according to claim 14, wherein the second lists are ordered according to the number of monitored cell reselections and/or handovers which have been executed by mobile terminals between the cells of the wireless cellular telecommunication network.

16. The method according to claim 11, wherein the method further comprises:
    transferring determined lists of at least one first node to each node.

17. The method according to claim 5, wherein the message is a paging request message.

18. The method according to claim 1, wherein the method is executed by the second node and further comprises:
    determining which third node sent the message;
    obtaining the third list of at least one first node which is associated with a determined third node; and
    transferring the message to at least one first node.

19. The method according to claim 18, wherein the telecommunication network is a wireless cellular telecommunication network, the message is a paging request message and the third list of at least one first node is obtained by reading the third list of at least one first node from a memory of the second node.

20. The method according to claim 19, wherein each node is a neighbor node of the second node such that different lists of at least one first node are associated with at least a part of the each neighbor node.

21. The method according to claim 20, wherein the at least one first node is a neighbor node of the second node.

22. The method according to claim 18, wherein the message is a paging request message having a field including a value such that when the value is equal to a predetermined value, the second node does not transfer the paging request message to said at least one first node.

23. The method according to claim 18, wherein the message is a paging request message having a field including a value such that the second node decrements the value prior to transferring the paging request message to said at least one first node.

24. A device for transferring a message to a plurality of nodes of a telecommunication network the device comprising:
- first list means for obtaining, at each node of the plurality of nodes, a first list having information representative of at least one cell said respective node manages;
- second list means for obtaining, at each node of said plurality of nodes, a second list having information representative of neighboring cells of the at least one cell said respective node manages; and
- third list means for determining a third list including at least one first node of the plurality of nodes to which the message has yet to be transferred, the third list means checking whether information included in the second list of the at least one first node is included in the first list of a third node of the plurality of nodes and, if not, whether the information is included in a second list of the third node, the message being received by a second node of the plurality of nodes from the third node.

25. A device for transferring a message in a telecommunication network to at least a first node of a plurality of nodes of the telecommunication network by a second node of the plurality of nodes, the message being received by the second node from a third node of the plurality of nodes, the device comprising:
- determining means for determining which third node sent the message;
- third list means for obtaining a third list including at least one first node which is associated with the determined third node, the third list including at least one first node of the plurality of nodes to which the message received from the second node by the third node has yet to be transferred; and
- transferring means for transferring the message from the second node to said at least one first node,
- wherein the device is included in the second node.

26. A non-transitory computer-readable medium storing computer-readable instructions thereon that when executed by a device for transferring a message to a plurality of nodes of a telecommunication network cause the device to perform a method comprising:
- obtaining, at each node of the plurality of nodes, a first list having information representative of at least one cell the respective node manages;
- obtaining, at each node of said plurality of nodes, a second list having information representative of neighboring cells of the at least one cell said respective node manages;
- determining a third list including at least one first node of the plurality of nodes to which the message has yet to be transferred; and
- checking whether information included in the second list of the at least one first node is included in the first list of a third node of the plurality of nodes and, if not, whether the information is included in a second list of the third node, the message being received by a second node of the plurality of nodes from the third node.

27. A device for transferring a message to a plurality of nodes of a telecommunication network, the device comprising:
- a first list unit configured to obtain, at each node of the plurality of nodes, a first list having information representative of at least one cell the respective node manages;
- a second list unit configured to obtain, at each node of said plurality of nodes, a second list having information representative of neighboring cells of the at least one cell said respective node manages; and
- a third list unit configured to determine a third list including at least one first node of the plurality of nodes to which the message has yet to be transferred, the third list unit checking whether information included in the second list of the at least one first node is included in the first list of a third node of the plurality of nodes and, if not, whether the information is included in a second list of the third node, the message being received by a second node of the plurality of nodes from the third node.

* * * * *